(12) United States Patent
Carlavan et al.

(10) Patent No.: US 8,886,370 B2
(45) Date of Patent: Nov. 11, 2014

(54) SIMPLIFIED FLIGHT CONTROL SYSTEM INCLUDING A DECLUTCHABLE FRICTION DEVICE

(75) Inventors: Cédric Carlavan, Saint Alban de Roche (FR); Pascal Leguay, Alleins (FR)

(73) Assignee: Airbus Helicopters, Marignane Cedex (FR)

( * ) Notice: Subject to any disclaimer, the term of this patent is extended or adjusted under 35 U.S.C. 154(b) by 898 days.

(21) Appl. No.: 13/102,238

(22) Filed: May 6, 2011

(65) Prior Publication Data

US 2011/0276202 A1 Nov. 10, 2011

(30) Foreign Application Priority Data

May 7, 2010 (FR) .................................. 10 01973

(51) Int. Cl.
*G05D 1/10* (2006.01)
*B64C 13/04* (2006.01)
*B64C 13/10* (2006.01)
*B64C 13/30* (2006.01)
*B64C 27/59* (2006.01)
*G05G 5/08* (2006.01)
*G05G 5/22* (2006.01)

(52) U.S. Cl.
CPC ................. *B64C 13/10* (2013.01); *B64C 13/30* (2013.01); *B64C 27/59* (2013.01); *G05G 5/08* (2013.01); *G05G 5/22* (2013.01); *Y02T 50/44* (2013.01)
USPC ....... 701/11; 701/3; 701/4; 701/8; 244/17.11; 244/75.1; 244/221; 244/224; 244/99.2

(58) Field of Classification Search
USPC .......... 701/3, 4, 8, 11; 244/17.11, 17.13, 7 A, 244/75.1, 220, 221, 224, 99.2, 64
See application file for complete search history.

(56) References Cited

U.S. PATENT DOCUMENTS 244,091 A * 7/1881 Tenny ........................ 192/107 R
2,772,841 A * 12/1956 Bonsteel ........................ 244/223
2,837,931 A * 6/1958 Brundage .................... 74/89.39

(Continued)

FOREIGN PATENT DOCUMENTS

FR 2678577 A1 1/1933
FR 764635 A 5/1934

(Continued)

OTHER PUBLICATIONS

Search Report and Written Opinion; Application No. FR1001973; dated Jan. 11, 2011.

(Continued)

*Primary Examiner* — Thomas G Black
*Assistant Examiner* — Sara Nelson
(74) *Attorney, Agent, or Firm* — Brooks Kushman P.C.

(57) ABSTRACT

The present invention relates to a friction device (11) for maintaining a control member (2, 8) in a determined position. The device comprises a contact part (16) movable between a declutched stable position and a clutched stable position, and vice versa. The clutched stable position corresponds to a position in which the contact part (16) bears against the control member (2, 8) in such a manner as to establish a determined friction force. An electromechanical drive means moves the contact part (16) between the two stable positions. The device includes remote control means for activating and deactivating the drive means.

16 Claims, 3 Drawing Sheets

(56) References Cited

U.S. PATENT DOCUMENTS

| | | | | |
|---|---|---|---|---|
| 2,856,788 | A * | 10/1958 | Jovanovich | 74/469 |
| 3,269,199 | A * | 8/1966 | Deehan et al. | 74/89.25 |
| 4,109,886 | A * | 8/1978 | Tribken et al. | 244/178 |
| 4,122,927 | A * | 10/1978 | Berg | 192/48.8 |
| 5,099,161 | A * | 3/1992 | Wolfbauer, III | 310/80 |
| 5,121,019 | A * | 6/1992 | Pradler | 310/83 |
| 5,190,243 | A * | 3/1993 | Guimbal | 244/17.25 |
| 5,412,299 | A * | 5/1995 | Gregory et al. | 318/628 |
| 5,779,446 | A * | 7/1998 | Althof et al. | 416/36 |
| 5,868,359 | A * | 2/1999 | Cartmell et al. | 244/223 |
| 6,237,433 | B1 * | 5/2001 | Rodrigues | 74/89.39 |
| 2003/0094539 | A1 * | 5/2003 | Schaeffer et al. | 244/17.13 |
| 2004/0061382 | A1 * | 4/2004 | Schreier | 310/13 |
| 2005/0151672 | A1 * | 7/2005 | Augustin et al. | 340/965 |
| 2005/0268736 | A1 * | 12/2005 | Gaechter | 74/89.23 |
| 2006/0070827 | A1 * | 4/2006 | Sandells | 188/72.7 |
| 2006/0113933 | A1 * | 6/2006 | Blanding et al. | 318/116 |
| 2006/0266146 | A1 * | 11/2006 | Waide | 74/424.92 |
| 2009/0283371 | A1 * | 11/2009 | Winkler et al. | 188/72.6 |
| 2010/0024580 | A1 * | 2/2010 | Hadley et al. | 74/89.26 |
| 2011/0132106 | A1 * | 6/2011 | Moulon et al. | 73/862.381 |
| 2012/0011950 | A1 * | 1/2012 | Kracke | 74/89.23 |
| 2012/0072056 | A1 * | 3/2012 | Hasan et al. | 701/3 |

FOREIGN PATENT DOCUMENTS

| | | |
|---|---|---|
| FR | 2295473 A1 | 7/1976 |
| GB | 487145 A | 6/1938 |
| GB | 703682 | 2/1954 |
| WO | 03081554 A1 | 10/2003 |

OTHER PUBLICATIONS aerospatiale, "Commandes Du Rotor Principal", 1997, 1 page.

* cited by examiner

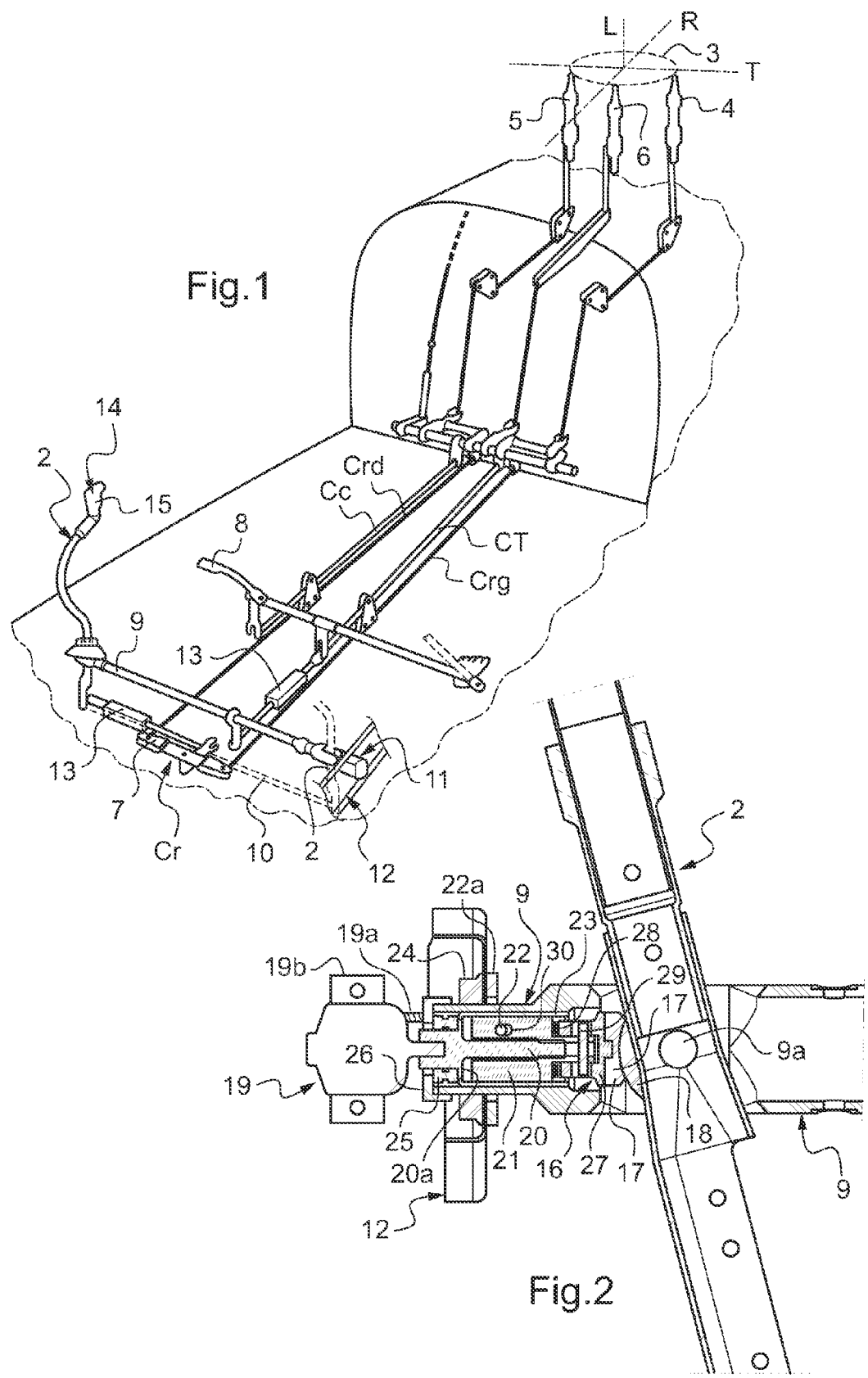

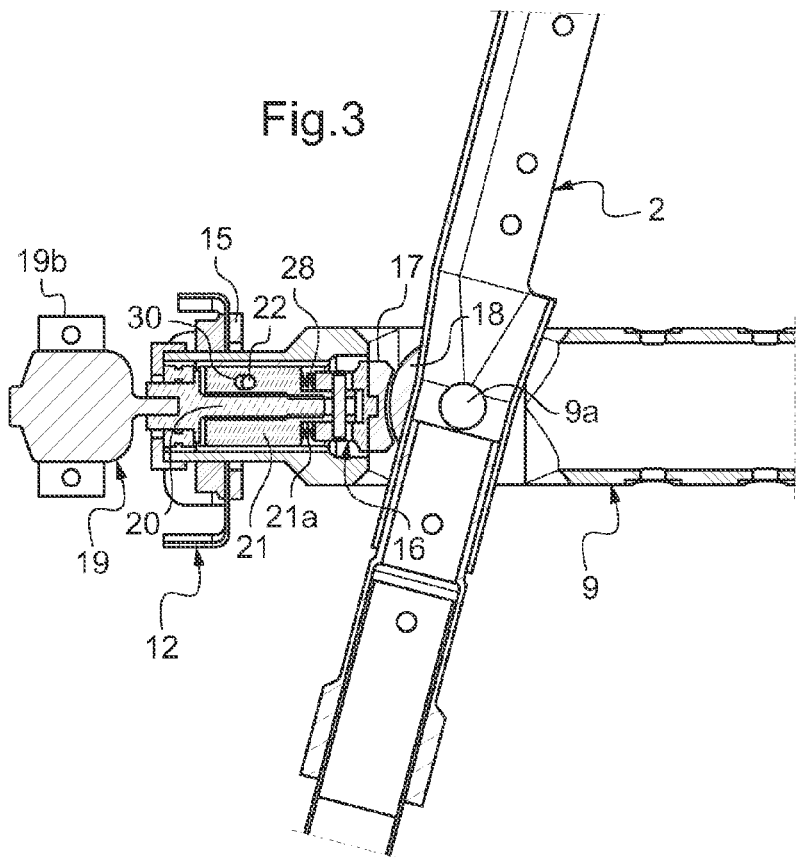
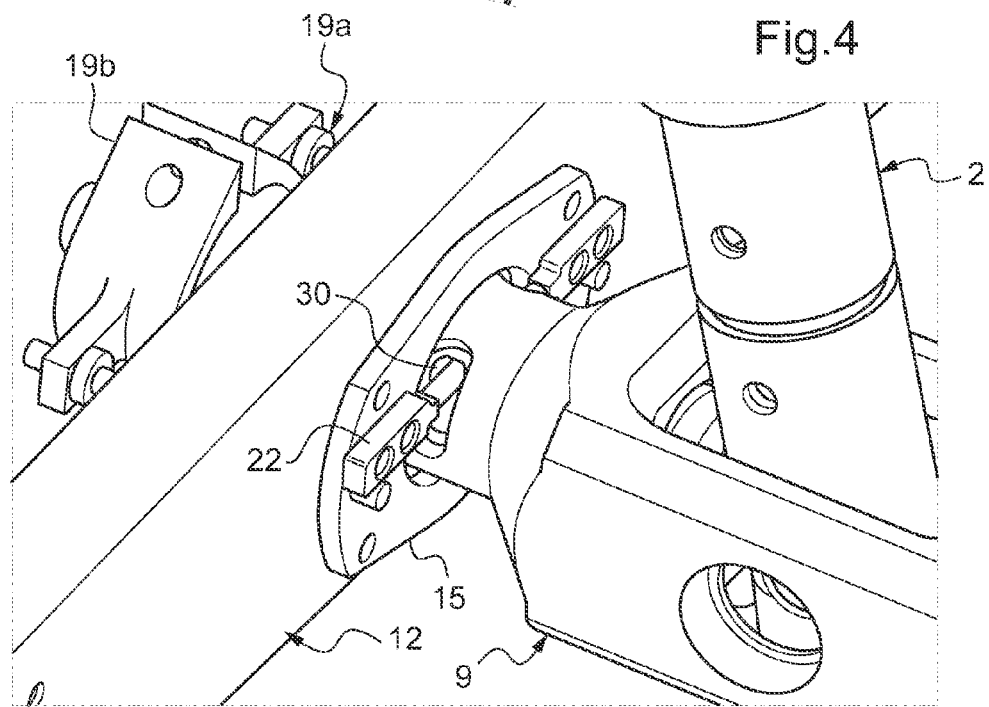

SIMPLIFIED FLIGHT CONTROL SYSTEM INCLUDING A DECLUTCHABLE FRICTION DEVICE

CROSS REFERENCE TO RELATED APPLICATIONS

This application claims the benefit of FR 10 01973 filed on May 7, 2010, the disclosure of which is incorporated in its entirety by reference herein.

BACKGROUND OF THE INVENTION (1) Field of the Invention

The present invention relates to the general technical field of flight control systems, in particular for aircraft and more generally for aircraft such as airplanes, rotorcraft, or helicopters.

The present invention relates more particularly to flight control systems suitable for implementing autopilot functions. Such control systems serve to adjust attitude-varying moving members of an aircraft such as an airplane or a rotorcraft as a function of the actuation of control members acting on at least one flight control linkage.

(2) Description of Related Art

Flight control systems are known for controlling a swashplate of a helicopter main rotor. In such an example, the moving members are constituted by hydraulic servo-controls that are connected to the swashplate of the main rotor. Action on a cyclic stick, e.g. action taken by the pilot, acts on the angle of inclination of the swashplate about two perpendicular axes. The angle of inclination of the swashplate then imparts an angle of inclination to the attitude of the main rotor, which angle depends on the angular movement of the cyclic stick.

In known manner, moving the cyclic stick from front towards the rear or vice versa causes the aircraft to move in pitching, while moving the cyclic stick from right to left or vice versa causes the aircraft to perform a roll movement. The pitching and roll movements of the aircraft are thus generated by imparting corresponding tilt to the main rotor.

The roll and pitching flight control axes are preferably embodied by distinct control linkages connecting the attitude-varying moving members to the cyclic stick.

The flight control linkages of a helicopter may be fitted with stabilizer actuators, referred to as series actuators, that are controlled by an autopilot system. These series actuators are connected in series in the flight control linkages and they move the attitude-varying moving members situated downstream from the positions of said series actuators. Nevertheless, the movements of the moving members must not give rise to movements of other members situated in the flight control linkages and situated upstream from the positions of said series actuators, e.g. they must not move the cyclic sticks.

Certain autopilot systems include parallel actuators, referred to as trim actuators, that are installed in parallel with the flight control linkages as close as possible to the sticks and/or the pedals, and that serve automatically to correct the positions of the moving members. It is in general such trim actuators that serve to anchor the stabilizer actuators.

In a simplified autopilot system that does not include trim actuators and that merely provides stabilization on two axes, the pitching and roll axes, it is possible to use a friction mechanism on the two cyclic control axes as a replacement for anchoring the stabilizer actuators.

By way of example, document FR 764 635 describes friction means for cyclic flight control. The friction means comprise two independent friction mechanisms on two distinct control axes. Each friction mechanism includes an adjustment wheel. The adjustment wheel may be tightened to a greater or lesser extent against a slideway and serves to define the magnitude of the friction in each friction mechanism in independent manner. The use of two friction mechanisms increases the number of on-board parts and weight, thereby constituting a drawback that is not negligible for an aircraft of the helicopter type. Furthermore, those friction means are generally set once and forever during initial assembly or subsequent revision, and they are then no longer accessible from the cockpit.

Document FR 2 678 577 mentions an embodiment in which the friction means use a hemispherical ball joint at the base of the cyclic stick. The ball joint is used for pivoting the cyclic stick and serves to constitute friction means. The ball joint has a stationary friction cup secured to the floor of the aircraft, with the stick passing therethrough, together with a friction cup connected to said stick. The friction cup bears against the stationary cup. A knob surrounding the stick makes it possible to adjust the level of friction between the two cups. The knob serves to modify friction simultaneously about both control axes (roll and pitching). In spite of that simplified adjustment, those friction means present a certain number of drawback. Those friction means are mechanically complex and often unreliable or not accurately reproducible in terms of setting levels. The adjustment of the friction means is also difficult for the copilot to access.

Document FR 2 295 473 also discloses an autopilot system including series actuators with amplitude-limited authority. A flight director system gives the pilot information enabling the pilot to recenter the series actuator when they are close to their extreme extension or retraction positions. A preadjusted friction member is provided in an embodiment in order to keep the control stick in the position to which it was put by the pilot.

When the series actuators are installed relatively close to the cyclic stick, known embodiments present the major drawback that the preadjusted level of friction needed for performing the function of anchoring said actuators constitutes an impediment for the pilot when it is necessary to take back control of the aircraft.

SUMMARY OF THE INVENTION

An object of the present invention is consequently to provide a novel flight control system that does not have the above-mentioned drawbacks, without degrading the comfort for the pilot in manipulating the flight controls.

Another object of the present invention is to provide a novel flight control system making it possible to stabilize short-term and long-term piloting, in spite of the absence of trim actuators.

Another object of the present invention is to propose a novel friction device making it possible to overcome the above-mentioned limitations.

Another object of the present invention is to propose a novel simplified autopilot system that manages a flight control system while overcoming the above-mentioned limitations.

The objects given to the invention are achieved by means of a friction device for maintaining a manual control member in a determined position, wherein the device comprises:

a contact part movable between a declutched stable position and a clutched stable position, and vice versa, said clutched stable position corresponding to a position in which the contact part bears against the control member in such a manner as to establish a determined friction force;

electromechanical drive means for moving the contact part between the two stable positions; and remote control means for activating and deactivating the drive means.

In an embodiment in accordance with the invention, the drive means comprise an electric motor imparting rotary drive to a threaded shaft having a nut mounted thereon, the nut being secured to the contact part, said nut being prevented from moving in rotation by a stationary stop finger having one end engaged transversely in said nut in such a manner as to impose movement in translation on said nut in a guide jacket under the effect of rotation of the threaded shaft.

In an embodiment in accordance with the invention, the contact part has a female fitting of hemispherical shape for coming to bear against a male fitting of complementary hemispherical shape fastened on the control member in order to establish friction.

In an embodiment, the device in accordance with the invention includes compensation means for automatically taking up the wear of the parts providing the friction.

In an embodiment in accordance with the invention, the compensation means comprise firstly a fitting support slidably mounted and prevented from moving in rotation on an end portion of the nut, which end portion presents a diameter smaller than the diameter of the remaining portion of said nut, and secondly a spring mounted on the end portion of the nut between the fitting support and a shoulder formed by the remaining portion, said spring being compressed when friction is established.

In an embodiment, the device in accordance with the invention includes limiter means for automatically limiting the friction force to a determined maximum friction threshold.

In an embodiment in accordance with the invention, the limiter means comprise an oblong slot formed in the nut and having the end of the stationary stop finger engaged therein, thereby limiting the stroke of movement in translation of the nut to a distance corresponding to the longitudinal dimension of the oblong slot and consequently limiting the compression of the spring.

In an embodiment, the device in accordance with the invention includes means for adjusting the level of the friction force.

In an embodiment in accordance with the invention, the control member is a cyclic stick of a rotorcraft of the helicopter type.

The objects given to the invention are also achieved by means of a flight control system for an aircraft having at least one moving member for varying attitude, the system comprising:

at least one manual control member acting on at least one control axis of the aircraft; and at least one control linkage for each control axis, each control linkage connecting the control member to at least one attitude-varying moving member of the aircraft, wherein the system includes a friction device as described above in at least one control linkage.

In an embodiment in accordance with the invention, the manual control member is a cyclic stick and the attitude-varying moving member is a swashplate, the control axes thus comprising the roll control axis and the pitching control axis of the aircraft.

In an embodiment, the flight control system in accordance with the invention includes pedals as a control member, for acting on an antitorque rotor, the control axes thus including at least the yaw control axis of the aircraft.

In an embodiment, the flight control system of the invention includes a collective stick as a control member for acting on the collective pitch of a main rotor, the control axes thus including at least the collective pitch control axis.

In an embodiment, the flight control system in accordance with the invention has two cyclic sticks connected together by a pitch interlink tube to which they are hinged, the friction device constituting an extension at one end of said pitch interlink tube mounted to rotate relative to a longeron of the aircraft structure, and the center of the male hemispherical fitting coinciding with the point of intersection between the axis of said pitch interlink tube and the roll axis of rotation of the cyclic stick situated on the same side.

In an embodiment, the flight control system in accordance with the invention includes means for adjusting the friction force level on at least one control linkage in order to optimize the piloting comfort parameter, in particular on cyclic control linkages.

In an embodiment, the flight control system in accordance with the invention includes means for increasing the stability of the aircraft.

In an embodiment of the flight control system in accordance with the invention, the means for increasing the stability comprise:

actuator means having amplitude-limited authority, the actuator means being mounted in series in at least one control linkage so as to act on the attitude-varying moving member as a function of a flight setpoint;

means for determining the amplitude margin of the actuator means having amplitude-limited authority;

an indicator informing the pilot when the amplitude margin is less than a determined value and informing the pilot of the direction in which to move the manual control member in order to restore a margin of sufficient amplitude, said indicator thus providing long-term information about attitude or trajectory control; and means for restoring the amplitude margin while conserving the positioning of the attitude-varying moving member.

In an embodiment in accordance with the invention, the remote control means comprise a switch installed on a handle of the control member.

In an embodiment in accordance with the invention, the means for adjusting the friction force level are associated with a remote adjustment member provided on the manual control member.

The objects given to the invention are also achieved by means of a simplified autopilot system comprising at least one computer and software means for implementing management functions of a flight control system, wherein the autopilot system comprises:

at least one manual control member suitable for acting on at least one control axis of the aircraft;

at least one control linkage for each control axis, said linkage connecting the control member to at least one attitude-varying moving member of the aircraft;

actuator means with amplitude-limited authority connected in series in at least one control linkage, so as to control the position of the attitude-varying moving member as a function of a flight setpoint and act, if necessary on the attitude-varying moving member to modify its position;

means for determining the amplitude margin of the actuator means having amplitude-limited authority;

an indicator informing the pilot when the amplitude margin is less than a determined value and informing the pilot of the direction in which to move the manual control member in order to restore a margin of sufficient amplitude, said indicator thus providing long-term information about attitude or trajectory control;

means for restoring the sufficient amplitude margin while conserving the positioning of the attitude-varying moving member; and a friction device as described above.

In an embodiment in accordance with the invention, the manual control member is a cyclic stick, the control axes thus comprising the roll control axis and the pitching control axis.

In an embodiment in accordance with the invention, the simplified autopilot system comprises a loop for monitoring manual piloting activity and means for automatically declutching the friction device in order to declutch the friction device when a determined manual piloting activity threshold is crossed.

The objects given to the invention are also achieved with an aircraft of the rotorcraft or helicopter type including a flight control system as described above.

The objects given to the invention are also achieved with an aircraft of the rotorcraft or helicopter type including a simplified autopilot system as described above.

The friction device in accordance with the invention presents the advantage of being capable of acting simultaneously on the roll control linkage and on the pitching control linkage.

The friction device in accordance with the invention thus presents the advantage of providing a weight saving in comparison with using a specific friction mechanism on each control linkage.

Another advantage of the friction device in accordance with the invention lies in the fact that it is clutchable/declutchable remotely without effort on the part of the pilot.

Another advantage of the friction device in accordance with the invention results from its compact nature, making it easier to integrate in a rotorcraft flight control system. Integrating the device at least in part in the pitch interlink tube contributes significantly to this compactness.

Furthermore, a friction device in accordance with the invention is suitable for being installed on aircraft in a fleet that is already in service and not solely on new aircraft.

In addition, the friction device according to the invention has the advantage of presenting low electricity consumption.

The friction device in accordance with the invention also presents the advantage of accommodating the wear of the contacting parts that provide the friction, thereby increasing the lifetime of said parts.

The friction device in accordance with the invention also presents the advantage of presenting a maximum level of friction. This maximum friction level is selected in such a manner as to make it possible, in the event of the device seizing the clutched position, for the pilot to continue flying under manual control and to land in complete safety.

An advantage of the simplified autopilot system in accordance with the invention lies in combining the friction device with the means that increase rotorcraft stability. Short-term stabilization is thus associated with long-term stabilization even in the absence of trim actuators.

An advantage of the flight control system in accordance with the invention lies in the possibility of it being used on the flight control axes of the aircraft regardless of whether or not they are fitted with stability increasing means.

BRIEF DESCRIPTION OF THE DRAWINGS

The invention and its advantages appear in greater detail from the context of the following description of an embodiment given by way of non-limiting illustration and with reference to the accompanying figures, in which:

FIG. 1 is a fragmentary diagrammatic view of an embodiment of a flight control system in accordance with the invention for use in a helicopter;

FIG. 2 is a section view of an embodiment of a friction device in accordance with the invention, associated with a cyclic stick of a helicopter, said friction device being in a clutched state;

FIG. 3 is a section view of an embodiment of a friction device in accordance with the invention, associated with a cyclic stick of a helicopter, said friction device being in a declutched state;

FIG. 4 is an enlarged detail of FIGS. 2 and 3; and

DETAILED DESCRIPTION OF THE PREFERRED EMBODIMENT

Figure 5:
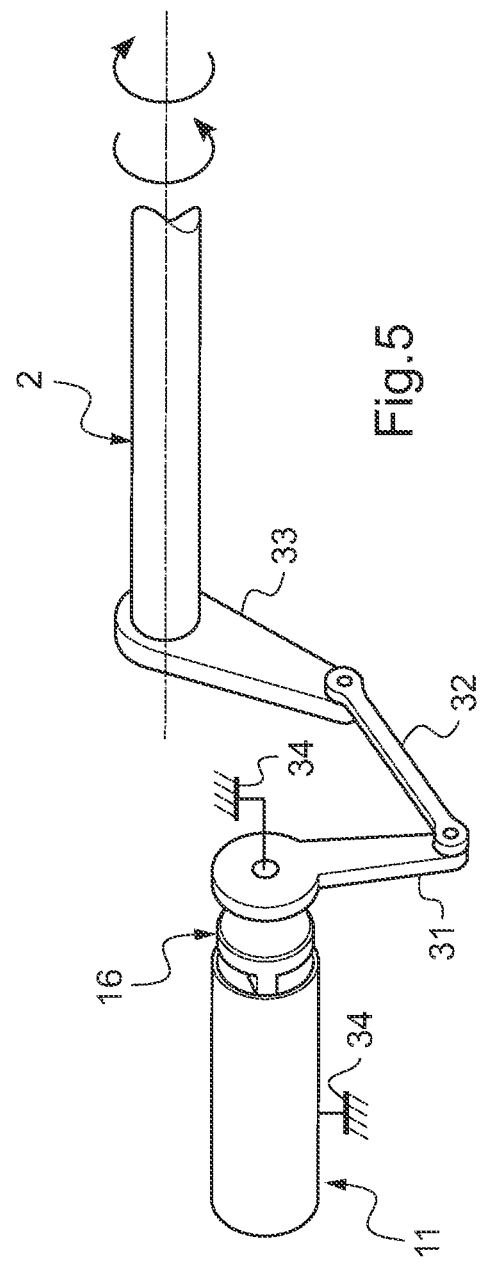
FIG. 5 shows an embodiment of a friction device in accordance with the invention, acting on a single control axis of an aircraft.

Elements that are structurally and functionally identical and that appear in more than one of the figures are given the same numerical or alphanumerical references in each of them.

Although reference below is made more particularly to a helicopter, the present invention may be incorporated in any rotorcraft type of aircraft.

FIG. 1 is a diagrammatic view of an embodiment of a flight control system in accordance with the invention for use in a rotorcraft of the helicopter kind.

By way of example, the flight control system is for a rotorcraft that has at least one main rotor.

The flight control system includes dual manual control members 2, each acting on at least two controlled axes of the rotorcraft, namely the pitching axis T and the roll axis R. Left and right mechanical control linkages Crg and Crd, that are combined by a pivoting mechanism 7, thus connect the control members 2 to a swashplate 3 of the main rotor via hydraulic servo-controls 4 and 5 for controlling roll. The combination of the left and right control linkages Crg and Crd constitutes the roll control linkage Cr.

A pitch control linkage Ct connects the control member 2, specifically a cyclic stick, to the swashplate via an additional hydraulic servo-control 6, thereby providing pitch control.

By way of example, the manual control member 2 is a cyclic stick acting on the control axes comprising the roll control axis and the pitch control axis.

By way of example, the flight control system in accordance with the invention also includes pedals (not shown) as an additional control member for acting on an antitorque rotor, the control axes thus including a yaw control axis L.

The flight control system in accordance with the invention may also include a collective stick 8 as an additional control member for acting on the collective pitch of the main rotor, the control axes thus including a collective pitch control axis. During movements of the collective stick 8, the hydraulic servo-controls 4, 5, and 6 act simultaneously and with the same amplitude. A specific control linkage Cc is provided for this purpose. Other mechanisms for transmitting and relaying the flight control system are very well known and are not described further herein.

In an embodiment, the flight control system in accordance with the invention has two cyclic sticks connected together by a pitch interlink tube 9 to which they are hinged. A connection rod 10 interconnecting the bottom ends of the cyclic sticks serves to transmit roll commands from one stick to the other.

The flight control system in accordance with the invention has a friction device 11 constituting an extension of the pitch interlink tube 9. This extension is mounted to rotate on a longeron 12 of the rotorcraft structure.

In an embodiment, the flight control system in accordance with the invention includes means for adjusting the friction force level (not shown) for the purpose of optimizing a piloting control parameter, in particular for the cyclic control linkages. The means for adjusting friction force level may, for example, be associated with a remote adjustment member provided on the cyclic stick.

In an embodiment, the flight control system in accordance with the invention has means for increasing the stability of the rotorcraft.

In an embodiment of the flight control system of the invention, the means for increasing stability comprise actuator means 13 having authority of limited amplitude that are mounted in series on each of the control linkages Cr and Ct so as to act on the attitude-varying moving member, in particular the swashplate 3, as a function of a flight setpoint. These actuator means 13 with limited-amplitude authority may, for example, be electric actuators.

The flight control system in accordance with the invention also has means for determining the amplitude margin of the actuator means 13 of limited-amplitude authority. These means for determining the amplitude margin may, for example, comprise one or more position sensors.

The flight control system in accordance with the invention also has an indicator informing the pilot when the amplitude margin is less than a determined value, e.g. 10% of the total stroke, and informing the pilot of the direction in which the manual control member should be moved in order to restore a margin of sufficient amplitude, said indicator thus providing long-term information concerning attitude or trajectory control.

The flight control system in accordance with the invention also has means for restoring the amplitude margin while conserving the positioning of the moving member, e.g. the swashplate 3. By way of example, the means for restoring the amplitude margin may comprise a specific computer or a computer incorporated in an autopilot system for automatically compensating the reestablishing of the amplitude margin. Sensors, such as Hall effect sensors, serve to determine the movement of the control member 2 and the amplitude of the actuator means 13 of limited authority. The means for restoring a margin of sufficient amplitude then order movement in a direction opposite to the order coming from the control member 2 (shortening or lengthening of actuators in series) so as to avoid changing the position of the attitude-varying moving member. By way of example, reestablishing the amplitude margin corresponds to recentering the series actuators.

In an embodiment in accordance with the invention, the friction device is activated and deactivated via remote control means 14 of the switch type, installed on a handle 15 of the control member 2.

FIG. 2 is a section view of an embodiment of the friction device in accordance with the invention, associated with the control member 2 of the cyclic stick type for a helicopter, said friction device being in a clutched state, and consequently being active.

The friction device in accordance with the invention includes a contact part 16 movable between a stable declutched position and a stable clutched position, and vice versa. The stable clutched position corresponds to a position in which the contact part 16 bears against the control member 2 so as to establish a determined friction force.

In an embodiment in accordance with the invention, the contact part 16 includes a female fitting of hemispherical shape for bearing against a male fitting 18 of complementary hemispherical shape, and fastened to the control member 2 in order to establish friction. The center of the male hemispherical fitting 18 coincides with the point of intersection between the axis of said pitch interlink tube 9 and the roll axis of rotation 9a of the cyclic stick co-operating directly with the friction device 11.

The friction device in accordance with the invention includes electromechanical drive means for moving the contact part 16 between the two stable positions. The remote control means 14 serve to activate and deactivate the drive means.

In an embodiment in accordance with the invention, the drive means comprise an electric motor 19 imparting rotary drive to a threaded shaft 20 having a nut 21 mounted thereon, which nut is secured to the contact part 16. The nut 21 is prevented from rotating by a stop finger 22 having one end engaged transversely in said nut 21, so as to impose movement in translation on said nut 21 inside a guide jacket 23 under the effect of the threaded shaft 20 rotating.

At least one fastener shaft 19a serves to fasten the electric motor 19 on the outside of the longeron 12. More precisely, the torque from the electric motor 19 is taken up by a support 19b clamped to the casing of the electric motor 19 and fastened to the longeron 12 via at least one fastener shaft 19a.

The stop finger 22 is fastened to the longeron 12 via a fastener plate 22a.

The pitch interlink tube 9 is guided in rotation in the longeron 12 by a bearing 24.

A ball abutment 25 takes up the bearing force from the threaded shaft 20, which shaft urges the contact part 16 against the male fitting 18. The ball abutment 25 is also prevented from moving in translation by a cap 26 that is fastened to the end of the pitch interlink tube 9. The ball abutment 25 is sandwiched between a shoulder 20a of the threaded shaft 20 and the cap 26.

In an embodiment, the device in accordance with the invention has compensation means for automatically taking up wear associated with friction between the female fitting 17 and the male fitting 18.

In an embodiment in accordance with the invention, the compensation means comprise firstly a fitting support 27 slidably mounted and prevented from moving in rotation on an end portion of the nut 21, which end portion presents a diameter that is smaller than the diameter of the complementary portion of said nut 21, and secondly a spring 28 mounted on the smaller-diameter end portion of the nut 21 between the fitting support 27 and a shoulder 21a made on the complementary portion of said nut 21.

The spring 28 is compressed when friction is established. A pin 29 passing through the fitting support 27 and a longitudinal slot in the end portion of the nut 21 enables said fitting support 27 to be prevented from moving in rotation. The pin 29 presents sufficient clearance in translation to enable the spring to push the fitting support 27 against the male fitting 18. Reference may be made to FIG. 2. The nut 21 thus drives the fitting support 27 in translation via the spring 28. Contact between the male and female fittings 18 and 17 is thus maintained independently of the wear of said fittings.

In an embodiment, the device in accordance with the invention includes limiter means for automatically limiting the friction force to a determined maximum friction threshold.

In an embodiment in accordance with the invention, the limiter means comprise an oblong slot 30 formed laterally in the body of the nut 21 and having engaged therein the end of the stop finger 22. The longitudinal direction of the oblong slot 30 is parallel to the axis of the nut 21. This oblong slot 30 thus limits the stroke of the nut 21 in translation to a distance that corresponds to the longitudinal dimension of said oblong slot 30, and consequently limits the extent to which the spring 28 can be compressed.

In an embodiment, the device in accordance with the invention includes adjuster means for adjusting the friction force level. For this purpose, the electric motor 19 may be a stepper motor so as to proceed with accurate adjustment of the compression of the spring 28.

FIG. 3 is a section view of an embodiment of a friction device in accordance with the invention, associated with a helicopter cyclic stick, said friction device being in a declutched state.

By way of example, FIG. 4 is an enlargement showing the elements shown in FIGS. 2 and 3 in an external view.

The female fitting 17 is no longer in friction contact with the male fitting 18. The electric motor 19 enables the nut 21 to be moved in translation over a stroke that is sufficient to ensure that the spring 28 is not less compressed. This stroke is determined by the longitudinal dimension of the oblong slot 30. The fitting support 27 is thus driven into the declutched position by means of the pin 29 against which it bears on the mechanical clearance in translation coming into abutment.

The present invention also relates to a simplified autopilot system for rotorcraft including at least one computer and software means for implementing management functions for the flight control system.

The simplified autopilot system comprises:

the dual manual control member 2 suitable for acting on at least two control axes of the rotorcraft;

at least one control linkage Cr, Ct for each control axis, said linkage connecting the control member 2 to at least one attitude-varying moving member of the rotorcraft;

the actuator means 13 having authority that is amplitude-limited, connected in series in each control linkage Cr, Ct so as to determine the position of the attitude-varying moving member as a function of a flight setpoint and so as to act, if necessary, on the attitude-varying moving member in order to modify its position;

means for determining the amplitude margin of the actuator means 13 having amplitude-limited authority;

the indicator informing the pilot when the amplitude margin is less than a determined value and informing the pilot of the direction in which the manual control member needs to be moved in order to restore a margin of sufficient amplitude, said indicator thus providing long-term information about attitude or trajectory control;

means for restoring the sufficient amplitude margin while conserving the positioning of the attitude-varying moving member; and the friction device 11 in accordance with the invention.

In an embodiment in accordance with the invention, the simplified autopilot system has a loop for monitoring manual piloting activity and means for automatically declutching the friction device when a determined threshold for manual piloting activity is reached.

By way of example, the autopilot system has a movement sensor on each cyclic control linkage so as to have available at all times information corresponding to the instantaneous position Pos of the cyclic stick. The autopilot system then continuously calculates the mean position Posm of the cyclic stick over a moving period T.

For this purpose, the following function is used:

$$E = \frac{1}{T} \times \sum_{T} (Pos - Posm)^2$$

which is calculated at each instant, thereby revealing pilot activity. When a minimum threshold for the function E is crossed, the autopilot system automatically causes the friction device 11 to declutch.

In order to avoid declutching the friction device when the pilot has not got a hand on the cyclic stick, provision may be made to place a presence detector such as a thermal detector or a pressure detector on the handle 15 of said cyclic stick. This then constitutes an additional condition that needs to be satisfied in order to cause the friction device to be automatically declutched.

Such a monitoring loop may also be provided on the additional control members such as the collective stick 8 and/or the pedal.

FIG. 5 shows an embodiment of a friction device 11 in accordance with the invention acting on the manual control member 2 of an aircraft. The control member 2, embodied by a rotary shaft, acts for example on a single control axis of an airplane or a helicopter. For example, it may be the collective pitch control axis or the pedal control axis of a helicopter, or an attitude control axis of an airplane.

The contact part 16 comes into friction engagement with a system of connecting rods 31, 32, 33 of the manual control member 2 when the friction device 11 is clutched. The friction device 11 and the connecting rod 31 against which the contact part 16 bears are prevented from moving in translation relative to a stationary portion 34 of the structure of the aircraft.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A friction device for maintaining a manual control member of an aircraft in a determined position, wherein the device comprises:

a contact part movable between a declutched stable position and a clutched stable position, and vice versa, said clutched stable position corresponding to a position in which the contact part bears against the control member in such a manner as to establish a determined friction force;

electromechanical drive means for moving the contact part between the two stable positions, wherein the drive means comprise an electric motor imparting rotary drive to a threaded shaft having a nut mounted thereon, the nut being secured to the contact part, said nut being prevented from moving in rotation by a stationary stop finger having one end engaged transversely in said nut in such a manner as to impose movement in translation on said nut in a guide jacket under an effect of rotation of the threaded shaft;

remote control means for manually activating and deactivating the drive means, wherein the remote control means are installed on the control member; and limiter means for automatically limiting the friction force to a determined maximum friction threshold, wherein the limiter means comprise an oblong slot formed in the nut and having the end of the stop finger engaged therein, thereby limiting a stroke of movement in translation of the nut to a distance corresponding to the longitudinal dimension of the oblong slot and consequently limiting a compression of the spring.

2. A friction device according to claim 1, including compensation means for automatically taking up the wear of the contact part and the control member providing the determined friction force.

3. A friction device according to claim 1, wherein the control member is a cyclic stick of a rotorcraft of a helicopter type.

4. A friction device according to claim 1, including means for adjusting the level of the friction force.

5. A friction device according to claim 1, wherein the contact part has a female fitting of hemispherical shape for coming to bear against a male fitting of complementary hemispherical shape fastened on the control member in order to establish friction.

6. A friction device according to claim 1, including compensation means for automatically taking up the wear of the contact part and the control member providing the determined friction force, and wherein the compensation means comprise firstly a fitting support slidably mounted and prevented from moving in rotation on an end portion of the nut, which end portion presents a diameter smaller than the diameter of the remaining portion of said nut, and secondly a spring mounted on the end portion of the nut between the fitting support and a shoulder formed by the remaining portion, said spring being compressed when friction is established.

7. A flight control system for an aircraft having at least one moving member for varying aircraft attitude, the system comprising:
- at least one manual control member acting on at least two control axes of the aircraft, wherein the manual control member is a cyclic stick and wherein the attitude-varying moving member is a swashplate controlled by servo-controls, the control axes thus comprising a roll control axis (R) and a pitch control axis (T) of the aircraft; and
- at least one control linkage (Cr, Ct, Cc, Cl) for each control axis, each control linkage (Cr, Ct, Cc, Cl) connecting a control member to at least one attitude-varying moving member of the aircraft,
- wherein the system includes a friction device for maintaining the at least one manual control member of the aircraft in a determined position in at least one control linkage (Cr, Ct, Cc, Cl), the friction device comprising:
  - a contact part movable between a declutched stable position and a clutched stable position, and vice versa, said clutched stable position corresponding to a position in which the contact part bears against the control linkage in such a manner as to establish a determined friction force, the contact part having a female fitting of hemispherical shape for coming to bear against a male fitting of complementary hemispherical shape fastened on the control member in order to establish friction,
  - electromechanical drive means for moving the contact part between the two stable positions, and
  - remote control means for activating and deactivating the drive means;
- wherein the flight control system has two cyclic sticks connected together by a pitch interlink tube to which the two cyclic sticks are hinged, the friction device constituting an extension at one end of said pitch interlink tube mounted to rotate relative to a longeron of the aircraft structure, and the center of the male hemispherical fitting coinciding with a point of intersection between the axis of said pitch interlink tube and the roll axis of rotation of the cyclic stick situated on the same side as said extension.

8. A flight control system according to claim 7, wherein the remote control means are installed on the control member for manual activation of the electromechanical drive means.

9. An aircraft of the rotorcraft or helicopter type including the flight control system in accordance with claim 7.

10. A flight control system according to claim 7, wherein the remote control means comprise a switch installed on a handle of the control member.

11. A flight control system according to claim 7, including means for increasing the stability of the aircraft.

12. A flight control system according to claim 11, wherein the means for increasing the stability comprise:
- actuator means having amplitude-limited authority, the actuator means being mounted in series in at least one control linkage (Ct, Cr, Cc, Cl) so as to act on the attitude-varying moving member as a function of a flight setpoint;
- means for determining an amplitude margin of the actuator means having amplitude-limited authority;
- an indicator informing a pilot when the amplitude margin is less than a determined value and informing the pilot of a direction in which to move the manual control member in order to restore a margin of sufficient amplitude, said indicator thus providing long-term information about attitude or trajectory control; and
- means for restoring the amplitude margin while conserving a positioning of the attitude-varying moving member.

13. A flight control system according to claim 7, including pedals as a control member for acting on an antitorque rotor, one of the control axes thus representing a yaw control axis (L) of the aircraft.

14. A flight control system according to claim 7, including a collective stick as a control member for acting on the collective pitch of a main rotor, one of the control axes thus representing a collective pitch control axis of the aircraft.

15. A flight control system according to claim 7, including means for adjusting a level of the determined friction force on at least one control linkage in order to optimize the piloting comfort parameter, in particular on cyclic control linkages.

16. A flight control system according to claim 15, wherein the means for adjusting a level of the determined friction force are associated with a remote adjustment member provided on the control member.

\* \* \* \* \*